(12) United States Patent
Gupta et al.

(10) Patent No.: US 12,478,731 B2
(45) Date of Patent: Nov. 25, 2025

(54) SYSTEMS AND METHODS FOR A DATA DRIVEN FRAMEWORK FOR ACTIONABLE FEEDBACK IN INSULIN MANAGEMENT FOR TYPE 1 DIABETIC SUBJECTS ON ARTIFICIAL PANCREAS

(71) Applicants: Arizona Board of Regents on behalf of Arizona Stat, Tempe, AZ (US); Mayo Foundation for Medical Education and Research, Rochester, MN (US)

(72) Inventors: Sandeep Gupta, Tempe, AZ (US); Ayan Banerjee, Tempe, AZ (US); Yogish C. Kudva, Rochester, MN (US)

(73) Assignees: Arizona Board of Regents on behalf of Arizona State University, Tempe, AZ (US); Mayo Foundation for Medical Education and Research, Rochester, MN (US)

( * ) Notice: Subject to any disclaimer, the term of this patent is extended or adjusted under 35 U.S.C. 154(b) by 633 days.

(21) Appl. No.: 17/913,108

(22) PCT Filed: Mar. 19, 2021

(86) PCT No.: PCT/US2021/023205
§ 371 (c)(1),
(2) Date: Sep. 20, 2022

(87) PCT Pub. No.: WO2021/188929
PCT Pub. Date: Sep. 23, 2021

(65) Prior Publication Data
US 2023/0138746 A1 May 4, 2023

Related U.S. Application Data

(60) Provisional application No. 62/992,813, filed on Mar. 20, 2020.

(51) Int. Cl.
*A61M 5/172* (2006.01)
*A61M 5/142* (2006.01)
(Continued)

(52) U.S. Cl.
CPC .......... *A61M 5/1723* (2013.01); *A61M 5/142* (2013.01); *G06F 16/27* (2019.01); *G16H 10/65* (2018.01); *A61M 2230/201* (2013.01)

(58) Field of Classification Search
CPC ............... A61M 5/1723; A61M 5/142; A61M 2230/201; A61M 2205/52;
(Continued)

(56) References Cited

U.S. PATENT DOCUMENTS

2010/0262434 A1* 10/2010 Shaya .................. A61B 5/7475
705/3
2016/0331310 A1* 11/2016 Kovatchev ............... A61B 5/11
(Continued)

OTHER PUBLICATIONS

American Diabetes Association, Glycemic Targets: Standards of Medical Care in Diabetes—2018, Diabetes Care 2018; vol. 41, Supplement 1, Jan. 2018.
(Continued)

*Primary Examiner* — Jason E Flick
(74) *Attorney, Agent, or Firm* — Polsinelli PC (57) ABSTRACT

The present disclosure discloses a data science driven system and associated methodology framework for mining relevant knowledge from input/output traces of a closed-loop control system for glycemic control to aid in actionable feedback for Type 1 diabetes management. The framework takes Continuous Glucose Monitor (CGM) records and insulin pump records from a closed loop control (CLC) system and interprets the CGM records and insulin pump data to provide medically useful information, wherein the
(Continued)

closed-loop control system is operable for operation in an "auto mode" (AP) and a "manual mode" (SAP).

27 Claims, 4 Drawing Sheets

(51) Int. Cl.
    *G06F 16/27*     (2019.01)
    *G16H 10/40*     (2018.01)
    *G16H 10/65*     (2018.01)
    *G16H 20/17*     (2018.01)

(58) Field of Classification Search
    CPC ........... A61M 2205/50; A61B 5/14532; A61B 5/4839; A61B 5/7271; A61B 5/7275; G06F 16/27; G16H 10/65; G16H 10/40; G16H 40/63; G16H 20/17
    See application file for complete search history.

(56) References Cited

U.S. PATENT DOCUMENTS

| | | | |
|---|---|---|---|
| 2018/0200438 A1* | 7/2018 | Mazlish | G16H 20/17 |
| 2019/0099551 A1* | 4/2019 | Yodfat | A61M 5/16831 |
| 2019/0125968 A1* | 5/2019 | Kircher, Jr. | A61M 5/1723 |
| 2019/0298259 A1* | 10/2019 | Mensinger | G16H 20/17 |
| 2019/0321553 A1* | 10/2019 | Grosman | A61M 5/1723 |

OTHER PUBLICATIONS

American Diabetes Association. Statistics About Diabetes. [Online] 2015. https://www.diabetes.org/resources/statistics/statistics-about-diabetes.

Danne et al., International Consensus on Use of Continuous Glucose Monitoring, 12, Diabetes Care, vol. 40, 2017.

Ekhlaspour et al., Closed Loop Control in Adolescents and Children During Winter Sports: Use of the Tandem Control-IQ AP System, 10, Pediatric Diabetes, vol. 20, 2019.

Geyer et al., Targeting postprandial glycaemia in children with diabetes: Opportunities and challenges, 4, Diabetes, Obesity and Metabolism, vol. 20, 2018.

Anderson et al., Hybrid Closed-Loop Control is Safe and Effective for People with Type 1 Diabetes Who Are at Moderate to High Risk for Hypoglycemia, Diabetes Technology & Therapeutics, vol. 21, No. 6, 2019.

Biester et al., DREAM5: An open-label, randomized, cross-over study to evaluate the safety and efficacy of day and night closed loop control by comparing the MD-Logic and automated insulin delivery system to sensor augmented pump therapy in patients with type 1 diabetes at home, Diabetes Obes Metab. 2019;21:822-828, 2019.

Breton et al., Closed-Loop Control During Intense Prolonged Outdoor Exercise in Adolescents With Type 1 Diabetes: The Artificial Pancreas Ski Study, Diabetes Care 2017;40:-1644-1650, Dec. 2017.

Deshpande et al., Design and Clinical Evaluation of the Interoperable Artificial Pancreas System (iAPS) Smartphone App: Interoperable Components with Modular Design for Progressive Artificial Pancreas Research and Development, Diabetes Technology & Therapeutics, col. 12, No. 1, 2019.

Forlenza et al., Successful At-Home Use of the Tandem Control-IQ Artificial Pancreas System in Young Children During a Randomized Controlled Trial, Diabetes Technology & Therapeutics, vol. 21, No. 4, 2019.

Garg et al., Glucose Outcomes with the In-Home Use of a Hybrid Closed-Loop Insulin Delivery System in Adolescents and Adults with Type 1 Diabetes, Diabetes Technology & Therapeutics, vol. 19, No. 3, 2017.

Kovatchev et al., Feasibility of Long-Term Closed-Loop Control: A Multicenter 6-Month Trial of 24/7 Automated Insulin Delivery, Diabetes Technology & Therapeutics, vol. 19, No. 1, 2017.

Lawton et al., Participants' Experiences of, and Views About, Daytime Use of a Day-and-Night Hybrid Closed-Loop System in Real Life Settings: Longitudinal Qualitative Study, Diabetes Technology & Therapeutics, vol. 21, No. 3, 2019.

Matulevicience et al., A Clinical Trial of the Accuracy and Treatment Experience of the Dexcom G4 Sensor (Dexcom G4 System) and Enlite Sensor (Guardian REAL-Time System) Tested Simultaneously in Ambulatory Patients with Type 1 Diabetes, Diabetes Technology & Therapeutics, vol. 16, No. 11, 2014.

Pinkser et al., Evaluation of an Artificial Pancreas with Enhanced Model Predictive Control and a Glucose Prediction Trust Index with Unannounced Exercise, Diabetes Technology & Therapeutics, vol. 20, No. 7, 2018.

\* cited by examiner

SYSTEMS AND METHODS FOR A DATA DRIVEN FRAMEWORK FOR ACTIONABLE FEEDBACK IN INSULIN MANAGEMENT FOR TYPE 1 DIABETIC SUBJECTS ON ARTIFICIAL PANCREAS

FIELD

The present disclosure generally relates a data driven framework, and in particular, to a data-driven framework for actionable feedback in insulin management for Type 1 diabetic patients on artificial pancreas.

BACKGROUND

Closed-loop blood glucose control (CLC) systems are designed to automate insulin delivery for the Type 1 Diabetic (T1D) population. CLC systems in patients are intended to maximize time spent in a consensus-acceptable glucose range (TiR, or "time in range"), while avoiding life threatening hypoglycemic events in which low blood glucose can cause adverse medical events. As of this filing, the only such system approved by the Food and Drug Administration (FDA) is the Medtronic Minimed 670G, but other systems, such as Tandem Control IQ, may be approved for real world use in the near future. Such systems use an external Continuous Glucose Monitor (CGM) to sense subcutaneous glucose levels and provide feedback to a control system, such as a proportional integrative and derivative (PID) for the Medtonic pump or the Control-IQ MPC algorithm for the Tandem pump. The control systems generate insulin delivery rates to maintain a target blood glucose (BG) level.

Significant research has been undertaken to show the efficacy of such control systems in real world deployments. A majority of studies focus on normal glucose, hyperglycemic or hypoglycemic ranges in three different time frames: daytime, overnight and 24 hours. The Medtronic 670G and Tandem report a TiR on either side of 70% with time-in-hypoglycemia less than 2% for tandem and time <4% for Medtronic. The remainder of the time is spent in hyperglycemia, with a major part being suspected to be post-prandial (PP) hyperglycemia, i.e. hyperglycemia within 2 hours after meal consumption. PP hyperglycemia is a significant contributor to poor HbA1C outcomes for T1D population.

There can be several reasons for PP hyperglycemia including: a) inadequate meal management due to a too-conservative bolus insulin-carbohydrate ratio, incorrect carbohydrate (carb) estimation, missed meal bolus insulin, or high glycemic index of a meal; b) withholding announcement of rescue carbs during hypoglycemia; c) frequent forced or voluntary disengagement of an "auto mode" resulting in sensor augmented pump (SAP) usage, which has been shown to have poor glycemic control outcomes compared to the auto mode; or d) behavioral changes such as increased food ingestion, change in meal composition, change in meal intake schedule, decreased physical activity, or mental stress. However, state-of-the-art data analysis focusing on TiR provides very limited knowledge to provide actionable feedback to the patient by the care provider.

For example, 2% time spent in hypoglycemia over a 24-hour period may indicate six CGM measurements of 5 minute duration each that may occur at different times throughout the day, or could indicate a single hypoglycemic event lasting 28 minutes. Whereas the latter case is a serious concern and warrants caution and action on the part of both a care provider and the individual, the former case may be due to CGM drift and could be easily solved by replacement or recalibration. Hence, an outcome measure of time in hypoglycemic range may not always be clinically relevant.

In another scenario, over a period of 24 hours with 20% time spent in hyperglycemia can be distributed over the PP phase, as well as over a post absorptive (PA) phase interval starting from around 2 hours after meal ingestion up to the next meal. A relative PP/PA distribution of hyperglycemia can guide actionable feedback for better glycemic control. A heavy PP hyperglycemic trend can indicate a necessity for updating a carb ratio to allow for more aggressive bolus insulin delivery. A heavy PA hyperglycemic trend requires evaluation of the meal composition or mode of bolus insulin delivery.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

The present disclosure discloses a data science driven system and associated methodology framework for mining relevant knowledge from input/output traces of a closed-loop control system for glycemic control to aid in actionable feedback for Type 1 diabetes management.

The framework takes Continuous Glucose Monitor (CGM) records and insulin pump records from a closed loop control (CLC) system and interprets the CGM records and insulin pump data to provide medically useful information, including: a) CGM consensus parameters for the time intervals of overnight, daytime, and 24 hours, b) post-prandial (PP) and daytime post-absorptive (PA) CGM and Pump statistics, c) total number and duration of biochemical hypoglycemic events daytime and overnight, d) all the above mentioned parameters divided into their respective modes: auto mode (AP) and manual mode (SAP), e) PP and PA CGM velocity distributions, f) distribution of auto mode times and durations, and g) CGM unavailability times and duration.

Despite advances in CLC technology, an average HbA1C level of T1D subjects was found to be greater than 8%. A common review of the aforementioned Medtronic system is that the system is too conservative in controlling hyperglycemia to avoid potentially fatal hypoglycemic events. The present disclosure analyzes real world deployments of CLC systems such as the Medtronic 670G system using a metrics-driven framework in terms of respective auto mode and manual mode performances and PP glucose management to provide a clinician with useful information about how an individual responds to the CLC system. Some main results found using the present framework were: a) auto mode results in more PP hyperglycemia than manual mode, b) auto mode results in less severe daytime hypoglycemic events than manual mode, and c) auto mode results in less glycemic variability than manual mode.

Methods

The present data science driven analysis system for CLC glucose management has been employed retrospectively on 56 users of the Medtronic 670G system to generate actionable feedback for effective insulin management.

International Consensus on CGM Analysis

Consensus metrics that the present system uses in this disclosure are as follows:

a) Percentage time in hyperglycemia (CGM>180 mg/dL), b) percentage of time in hyperglycemia critical (CGM>250 mg/dL), c) percentage time in range (CGM>=70 mg/dl and CGM <=180 mg/dL), d) percentage time in range secondary (CGM>=70 mg/dl and CGM <=150 mg/dL), e) percentage time in hypoglycemia level 1 (CGM <70 mg/dL), and f) percentage time in hypoglycemia level 2 (CGM <54 mg/dL).

Each of the above mentioned metrics are extracted in three different time intervals: daytime (6 am to midnight), overnight (midnight to 6 am) and 24 hours (12 am to 12 am).

Closed Loop Insulin Therapy Management at a Clinician's Practice

Figure 1:
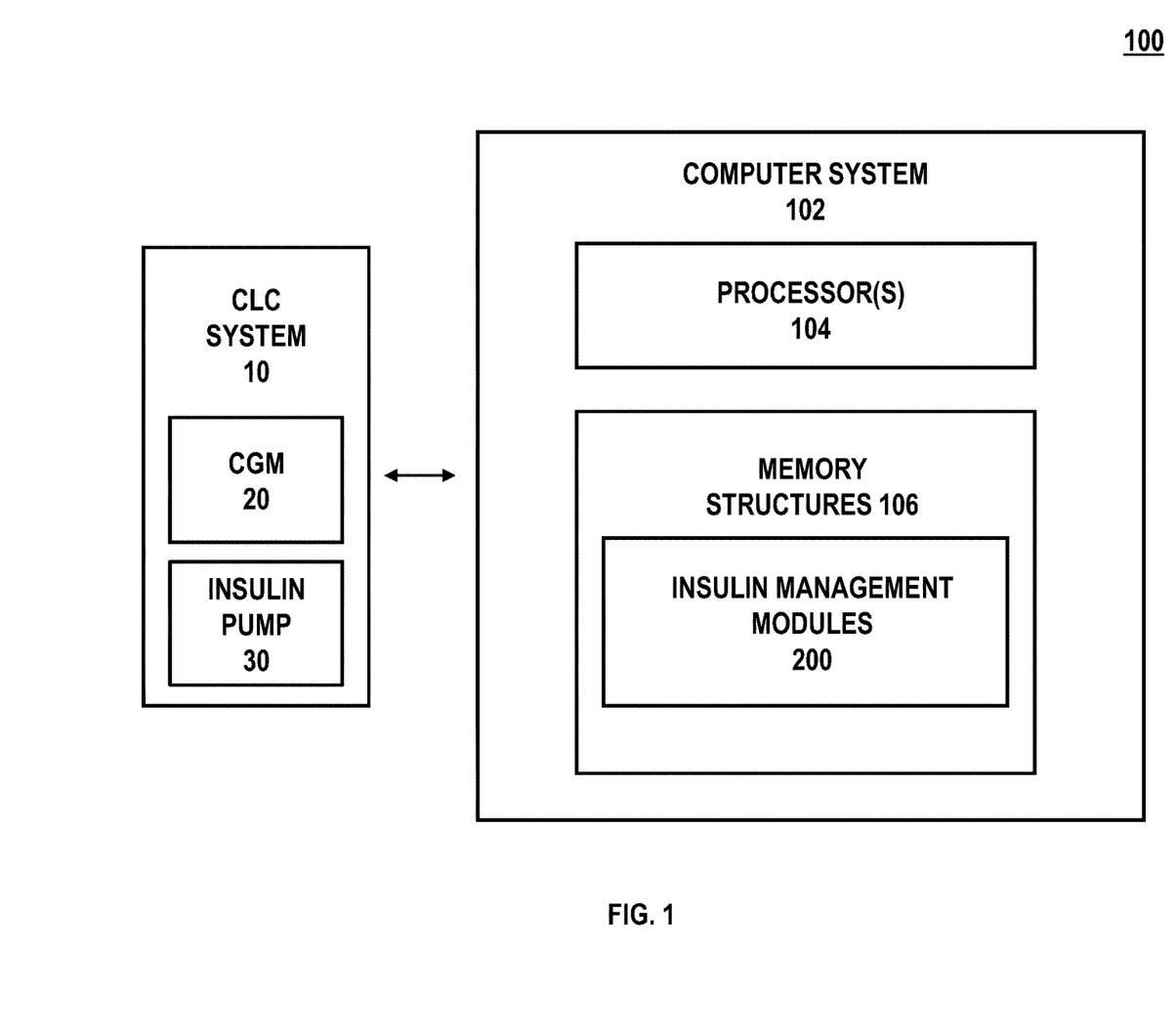
FIG. 1 is a diagram showing a system for providing actionable Type 1 Diabetic insulin management feedback to a provider.

In one embodiment with respect to a Medtronic 670H controller, one specific example of a CLC 10 (FIG. 1), a clinician can prescribe a change to the following factors based on individual needs:

a) Carb ratio: Carb ratio denotes an amount of bolus insulin that the patient can administer for every 10 grams of carbohydrate intake. Increasing the carb ratio results in an increase in meal bolus insulin value.

b) Active insulin time: Active insulin time denotes a time duration for which bolus insulin is considered to be active in the human body. If active bolus insulin time is set to 3 hours, 3 units (U) of administered bolus insulin will decay at the rate of 1 U per hour. Active bolus insulin time is a safety feature in the Medtronic 670G pump that limits an amount of correction bolus insulin that can be requested by a patient. Reduction of active bolus insulin time makes the CLC 10 more aggressive and allows the user to administer higher levels of correction bolus insulin.

c) Bolus insulin delivery pattern: Bolus insulin delivery pattern denotes when Auto Mode is disabled and manual bolus insulin delivery is resumed, or during administration of meal bolus insulin. Once a bolus insulin amount is selected, bolus insulin can be delivered in a single wave pattern or a dual wave pattern. In the single wave pattern, the entire amount of bolus insulin is delivered in a single square wave over a short period of time. In the dual wave pattern, a portion of the bolus insulin is delivered immediately while the remainder of bolus insulin is delivered with a delay. Depending upon the carbohydrate percentage of a meal, the clinician can select a single wave for high carbohydrate content or a dual wave for high fat or protein content.

d) Basal rate: During auto mode exits, the CLC system 10 starts to deliver basal insulin. The basal insulin delivery rate is a parameter that can be adjusted by the clinician.

The CLC system 10 provides a summary statistic for the entire study period.

General System

FIG. 1 illustrates the present system 100 that provides actionable insulin management feedback to a Medtronic 670G user utilizing knowledge extracted by insulin management modules 200 from data provided by the CLC system 10. CLC system 10 includes CGM 20 and associated insulin pump 30, that each produce respective CGM records 202 and insulin records 204 related to operation of the CLC system 10. System 100 includes a computer system 102 including memory structures 106 in communication with one or more processors 104 that collectively store and execute insulin management modules 200 (FIG. 2) for implementation of framework 300 (FIG. 3).

Software Architecture for Insulin Management Modules

Figure 2:
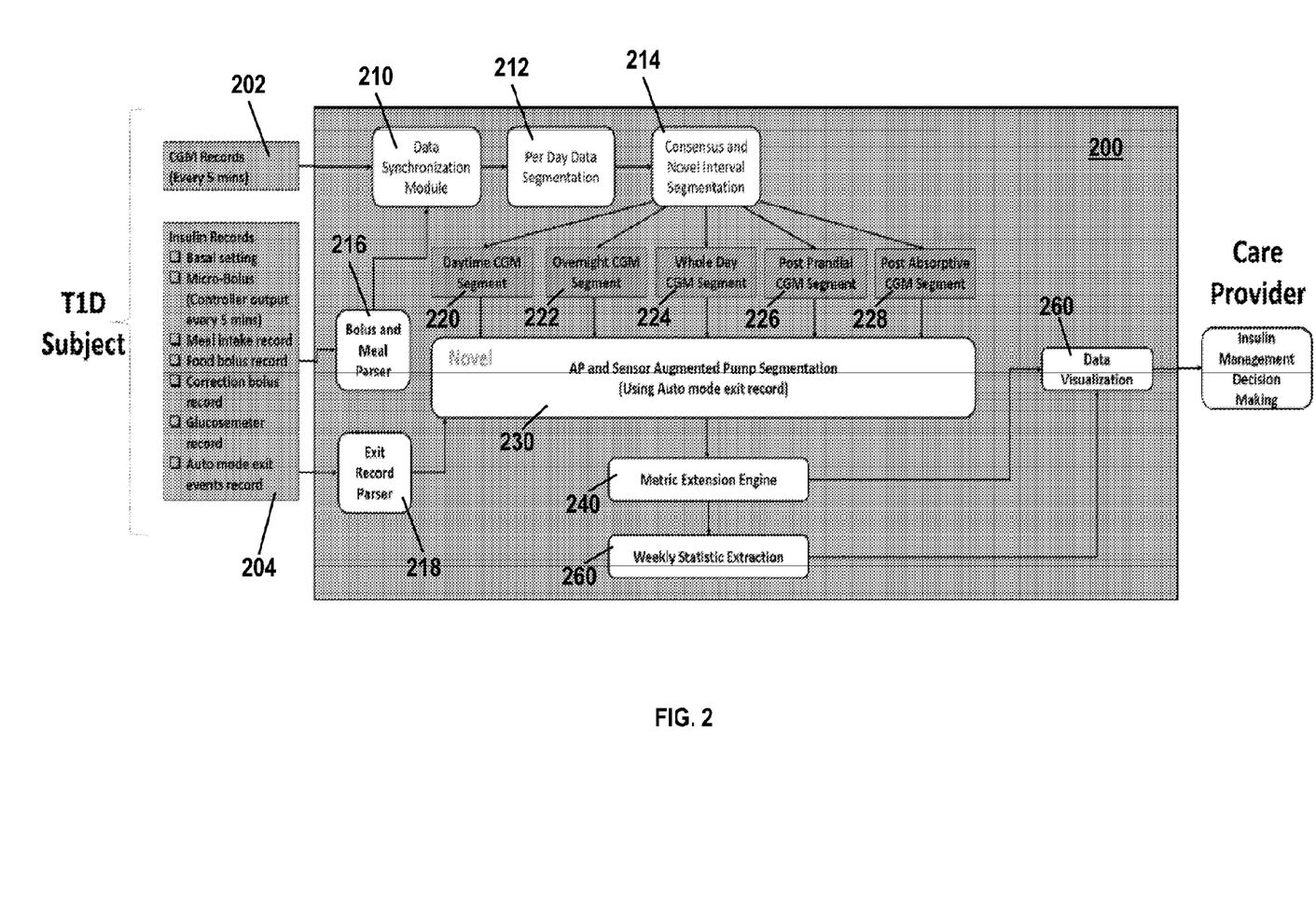
FIG. 2 is a diagram showing a software architecture to extract metrics and provide daily and weekly statistics to a care provider.
Figure 3:
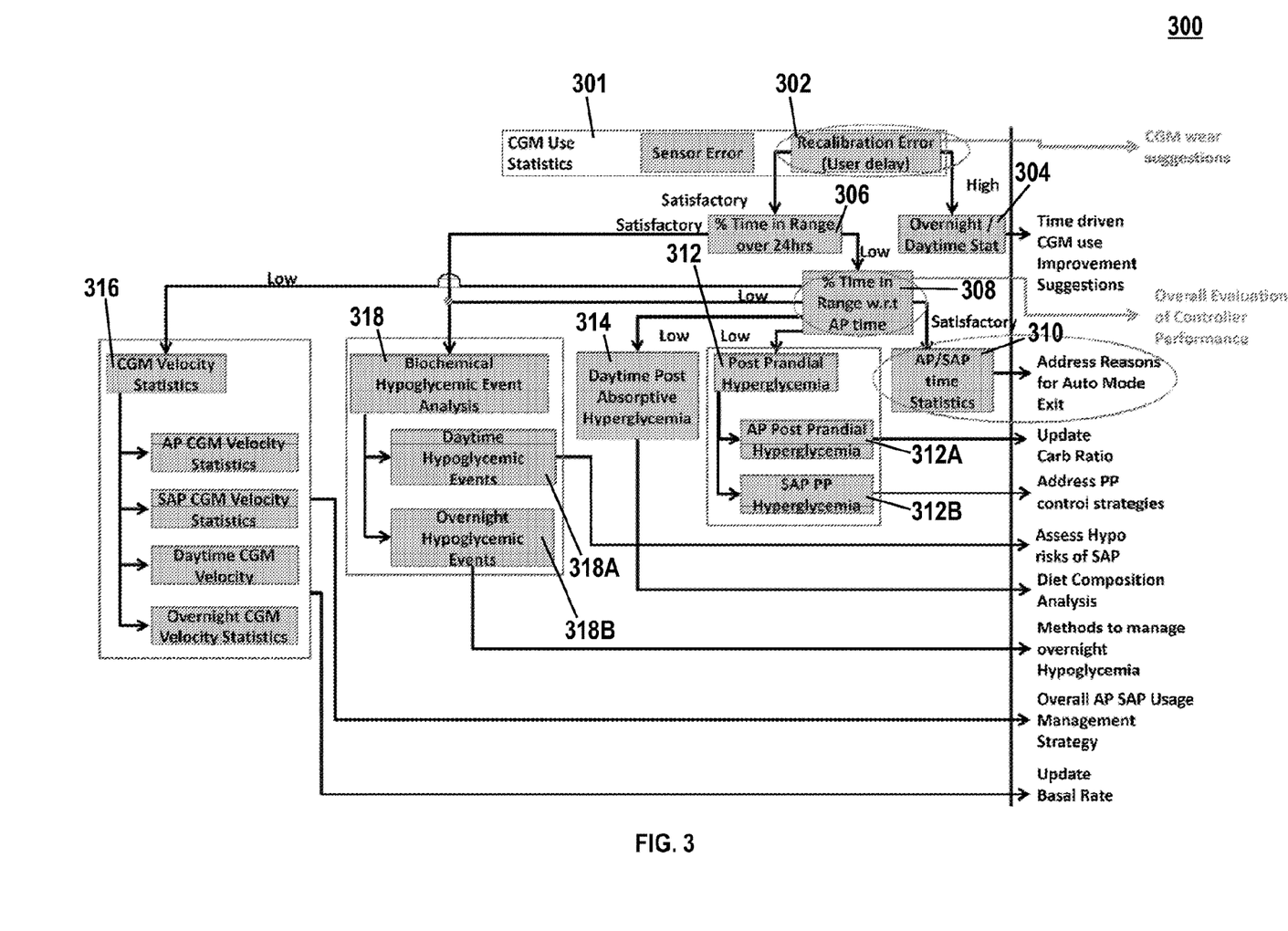
FIG. 3 is a flowchart showing a framework to provide actionable insulin management feedback for implementation by the software architecture of FIG. 2.

FIG. 2 shows a software architecture 200 developed to interpret data obtained by a CLC system 10 (FIG. 1) and to provide actionable feedback to a clinician including daily and weekly statistics. CGM records 202 are imported from CGM sensors 20 and insulin records 204 are imported from an insulin pump 30, which are collected from different hardware components of a CLC system 10 and are unsynchronized. A first component of the software architecture is a Data Synchronization Module 210. Since the insulin records 204 are by nature reactionary to outputs of the CGM sensors 20, data synchronization module 210 of software architecture 200 synchronizes a time stamp from insulin records 204 and with the most recent past CGM time stamp from CGM records 202. A Bolus and Meal parser module 216 then parses meal information provided in insulin records 204 including an amount of entered carbohydrate levels, time of meal intake and associated food bolus and correction bolus inputs. An Exit Record Parser module 218 then extracts instances for auto mode exits and annotates the reason for such exit.

Synchronized CGM and insulin records 202 and 204 are passed to a Per Day Data Segmentation Module 212, which creates data segments with a length of one day. Typically these segments each have 288 CGM samples, however, in case of unavailable CGM data, the segments can be of smaller length. Segment length information is used to determine CGM use statistics for a user. Daily segments are then passed to a Consensus and Interval Segmentation Module 214 that creates five sub-segments: daytime CGM segment 220, overnight CGM segment 222, whole day CGM segment 224, PP CGM segment 226 and daytime PA CGM segment 228. Each sub-segment is then passed through the AP/SAP Segmentation Module 230. AP/SAP Segmentation Module 230 considers auto mode exit annotations obtained from the Exit Record Parser 218 and divides each sub-segment into AP or SAP sub-segments to output fully segmented data, depending on the associated mode indicated by the Exit Record Parser 218. Each sub-segment is then passed to a Metrics Extraction Engine (MEE) 240, which interprets the fully segmented data according to the framework 300 for providing additional insight to CGM records 202 that would otherwise not be available. MEE 240 uses consensus thresholds to derive a number of CGM samples that fall in each of the ranges of interest. MEE 240 then determines a percentage time in each range following two methods: a) over 24 hours, and b) over AP or SAP time durations. In another aspect, MEE 240 also determines biochemical hypoglycemic events and their durations. In addition, for each sub-segment, MEE 240 extracts CGM velocities per sample time. Metrics obtained for each daily subsegment are then passed to a Data Visualization Module 250 for displaying the results to the care provider. Metrics are also passed to the Weekly Statistic Extraction Module 260, weekly mean, standard deviation, confidence intervals and P values for each metric.

Insulin Management Feedback Framework

FIG. 3 illustrates framework 300 for extraction and interpretation of data from CGM 20 and insulin pump 30 of CLC 10. Aspects of framework 300 are implemented as insulin management modules 200 of FIG. 2. One initial factor to consider when extracting useful data from a CLC system would be to look at CGM wear statistics, referred to at block 301 of FIG. 3. If CGM wear due to recalibration delay is determined to be not satisfactory, then the framework 300 applies a fine-grained analysis (block 304) on CGM usage during the daytime or overnight to suggest methods to improve CGM wear. This may require rearrangement of the person's diabetes kit and may involve pre-ordering CGM sensors. However, if CGM wear is determined to be satisfactory, then at block 306 the framework 300 looks at time spent in a consensus-acceptable glucose range (TiR, or "time in range") over 24 hours. If not satisfactory, then at block 308 TiR with respect to time spent in an "auto mode" (AP) is examined. If TiR with respect to AP time is satisfactory, then at block 310 AP exit reasons are examined to determine a plan to increase AP usage.

Otherwise, if TiR with respect to AP time is not satisfactory, then at respective blocks 312 and 314 PP hyperglycemia statistics (block 312) and PA hyperglycemia statistics (block 314) are examined. Increased PP hyperglycemia in AP time (block 312A) can potentially require an update on the carb ratio, while increased sensor augmented pump (SAP) times in PP state (block 312B) can require a fundamental change in controller usage strategy. On the other hand, a high percentage of the time being spent in PA hyperglycemia (block 314) can indicate that a composition of the individual's diet results in a slow release of glucose in the blood or that the controller insulin microbolus is not aggressive enough. Referring to block 316, CGM velocity statistics can also have indicators for meal composition. A high standard deviation can indicate that the food is carbohydrate heavy and hence the bolus insulin values need adjustment to account for the fast glucose increase. Even with a satisfactory percentage of time spent in a consensus-acceptable glucose range (TiR) over 24 hours, other factors are also useful in making insulin management decisions. As shown in block 316, a number and duration of biochemical hypoglycemic events during the daytime (block 316A) and overnight (block 316B) can be indicators of risks and should be discussed by the care provider with the patient to mutually agree on methods to control.

To enable such insulin management framework, the present disclosure defines the following metrics.

Metrics:

The present framework first segregates an entire study period after closed loop initiation into two categories:

AP: "AP" denotes the period when a PID controller of the CLC system 10 is generating and administering micro-bolus insulin. It is also termed as "Auto" mode.

Sensor Augmented Pump (SAP): "SAP" denotes the period when the user exits "Auto" mode and operates in "Manual" mode. During SAP, the present framework 300 considers that the user still has the CGM sensor and based on the CGM readings decides on the basal rate, correction bolus and meal bolus on their own.

In one specific example, the PID control algorithm of the Medtronic CLC system 10 exits from "Auto" mode due to six specific reasons:
a) user-initiated exit, when the user decides to exit auto mode and use the system in manual mode as SAP,
b) Auto mode high CGM reading, when the CGM reading is high for a specific period,
c) Auto mode low CGM reading, when the CGM reading is low for a specific period,
d) CGM under read, when the CGM reading is below 85% of the Glucosemeter reading,
e) CGM calibration error, when the user does not calibrate the CGM sensor despite system generated alarm for a specific period,
f) No CGM reading for three consecutive samples, Out of these six conditions, the first five conditions eventually result in "safe basal" insulin delivery after 90 mins of SAP or "manual" mode. The basal insulin delivery rate is decided based on the overnight basal insulin delivery rate set for the subject. The last condition immediately results in safe basal insulin delivery. For the purpose of this analysis framework 300, SAP includes "Auto" mode exits for the first five conditions but does not include periods of "safe basal" insulin delivery. Safe basal insulin delivery is considered a part of "Auto" mode. The last condition is excluded because it does not meet the definition of SAP, which requires the existence of CGM. In fact, periods of no CGM are excluded from the entire analysis since glucose control outcomes may not be evaluated without a CGM sensor.

Consensus Metrics: The present framework 300 first evaluates the metrics as proposed by the International Consensus of CGM analysis and segregates them into two additional time periods: AP and SAP.

In the present disclosure, the percentages of time are computed with respect to 24 hours (a day) (block 306) as well as with respect to the total AP or SAP time (block 308) in a day.

Determining TiR with respect to 24 hours (block 306) helps in evaluating the performance of the controller in presence of artifacts occurring in free living conditions, while TiR with respect to AP and SAP times (block 308) enables a comparison between CLC auto mode and SAP.

Each consensus metric is computed for three different time windows per day: i) day time from 6 am to midnight, ii) overnight from midnight to 6 am, and iii) whole day from midnight to midnight next day. Each time window is further divided into two classes: AP and SAP, depending on the associated mode.

Post-Prandial and Daytime Post Absorptive CGM Analysis: One aspect of this framework 300 is that it allows clinicians to analyze PP glucose (block 312) and PA glucose (block 314) dynamics of a patient and provide individualized insulin therapy.

Post-Prandial (PP) period is defined as the time period between meal intake until 2 hours after the start of meal ingestion.

Daytime post-absorptive (PA) period is defined as the time period that starts 2 hours after the start of meal ingestion and ends at the beginning of the next meal ingestion excluding the overnight period of 12 am to 6 am.

The present framework includes two parameters:

Percentage time in PP hyperglycemia: this is the percentage of time that CGM reading is greater than 180 mg/dL during post prandial period (block 312).

The PP period is further divided into AP and SAP times. In addition, the percentage time is computed with respect to 24 hours as well as with respect to AP and SAP time durations.

Percentage time in daytime PA hyperglycemia: this is the percentage of time that CGM reading is greater than 180 mg/dl during the daytime post absorptive period (block 314).

For daytime PA, no distinction is made between AP and SAP.

CGM Use Statistics: CGM recalibration is often seen as an extra burden to CGM users and the user often chooses to ignore recalibration. The Medtronic 670G CLC system has alarms associated with sensor recalibration, and if the user does not perform the calibration step within 90 minutes, the system defaults to safe basal insulin delivery mode. In addition, due to sensor errors or network errors, CGM data may be missing, a scenario where the system immediately defaults to safe basal insulin delivery mode. The present framework captures lack of CGM data in a CGM use statistic metric (block 101). This metric is a percentage of time over 24 hours that CGM data is available to the pump. The present framework 300 categorizes this statistic into daytime and overnight following the definitions of the consensus metrics. The present framework 300 further divides the overall CGM use into two categories: CGM unavailability due to recalibration delay (block 302) and due to sensor error.

CGM velocity metrics: CGM velocity (block 316) is defined as a rate of change of CGM values per minute. It is computed by taking the difference between consecutive CGM readings and dividing it by the difference between the sample times. The present framework reports CGM velocity for the three time periods, whole day, daytime, and overnight. For each time period, the CGM velocity is further categorized in to two classes: CGM velocity during AP and CGM velocity during SAP.

Hypoglycemia event analysis: The metric of percentage time in hypoglycemic range can often be misleading. This is because isolated and transient hypoglycemic events that last for less than 15 minutes are considered to be inconsequential for clinical intervention. A common threshold of 70 mg/dl is not selected based on an absolute physiological phenomenon. Even if CGM value reaches below this threshold it is common to not feel the effects of hypoglycemia (hypoglycemia unawareness). Hence the threshold itself may have significant individual variance. The present framework 300 introduces a new metric, number of biochemical hypoglycemic events per day (block 318) to capture clinically relevant hypoglycemic events that potentially need intervention and should be carefully considered by a clinician.

A biochemical hypoglycemic event is said to have occurred when at least three consecutive CGM readings are below the threshold of 70 mg/dL.

The metric is computed for daytime, overnight and whole day. Each time period is further divided into AP and SAP categories. In addition to number of events the mean duration of the events are also reported.

Study and Results

Study Design: Disclosed herein is a retrospective study (approved by the Mayo Clinic Institutional Review Board) to access the glycemic control in T1D on a CLC system 10 such as the Medtronic 670G system. The list of patients (n=56) on Medtronic 670G for management of T1D at Mayo Clinic was identified through type 1 diabetes registry. All adults (>18 years) with type 1 diabetes managed with an Artificial Pancreas System were included in this study with exclusion of pregnant patients.

The present system 100 collected subject-specific demographics, along with clinical and laboratory data from the subject's medical records. However, medical records were not reviewed from any potential subjects who have refused use of their records for medical research. The present system 100 obtained the Medtronic 670G download data including CGM and insulin records 202 and 204 from Medtronic Carelink software. The present system 100 also collected prospective Medtronic 670G downloaded data that is archived from Endocrinology clinical visits. The present system 100 then assessed Glucose Variability (GV) using the measures recommended by a recent consensus statement about reporting of CGM data: mean BG, standard deviation (SD), % of time spent in various target ranges (70-180 mg/dl), 181-250 mg/dl, >250 mg/dl, <70 mg/dl and <54 mg/dl), High blood glucose index (HBGI), Low blood glucose index (LBGI) and Average daily risk range (ADRR).

Patient Demographics: The study included T1D subjects with a mean HbA1C level of 8. The mean age was 44 with nearly an even distribution of male and female. The mean BMI was 29. More details are available in Table 3.

Metrics Extraction and Data Analysis Methodology:

Since data is obtained from a free-living study, the duration for which data is available varies across the population. In the present study, data across 4 weeks was considered, since 4 weeks was the minimum duration of data available across all subjects.

For each user, CGM data is first parsed and divided into segments, where each segment corresponds to a day worth of data. One day is considered to start at 12:00 am and end at 11:59 pm. If there is no CGM data loss, then there should be 288 samples in each daily segment. The segment as a whole is used to compute the metrics for the whole day time period. Each segment is then divided into two sub-segments: daytime sub-segment and overnight sub-segment. Each sub-segment and the whole segment is then divided into AP sub-segments and SAP sub-segments. In this manner, six sub-segments are obtained including daytime AP, daytime SAP, overnight AP, overnight SAP, whole day AP, and whole day SAP. In addition to these sub-segments, the whole day segment is divided into post prandial and daytime post absorptive sub-segments. The post prandial sub-segment is further subdivided into post prandial AP and post prandial SAP sub-segments.

For each sub-segment, the CGM series is investigated to count the number of samples that belong to the ranges specified in the metrics. To compute percentage with respect to 24 hours, the total number of samples in the specified range is divided by 288. To compute percentage with respect to AP or SAP times, the total number of samples in the specified range is divided by the number of samples that belong to AP/SAP duration.

Each metric is computed on a daily basis. Per day metrics are then averaged over a week. Per week average values of the metrics are then averaged over 4 weeks. These 4 week average values are then averaged over the entire study population. In addition, these metrics are also reported on a weekly basis.

Results

In this section, the usage of the present system 100 on Medtronic 670G users will be discussed. The first 4 weeks population average statistics to analyze the overall performance of the Medtronic 670G system will be considered.

CGM Unavailability Statistics

CGM unavailability is divided into two parts: a) delay due to recalibration, and b) sensor error. In the data it is shown that on an average 61% of CGM unavailability is due to recalibration error with a standard deviation of 21%, while the rest is due to sensor error. However, CGM was unavailable only 10% of the time on an average.

24 Hour Usage Statistics 24-hour usage statistics include several human factors in practical deployment including: a) auto mode exits either voluntary or involuntary; b) CGM unavailability either due to fatigue, planned uninstallation; or failure to recalibrate for unavoidable circumstances, such as long travels or even due to sensor errors; and c) pump shutdown due to low reservoir. In a 24 hour analysis, the system 100 distinguishes between AP and SAP but computes percentage times with respect to the 24 hour period. Most of the current research works on controller analysis focus on controller performance and hence focus on time periods where the controller is active and only give percentage times with respect to that active duration of the controller. This is useful to understand the effectiveness of the controller but does not reflect the performance seen by users. A 24 hour statistic can not only show the user the real performance in practice but also expose the reason for suboptimal performance.

Table 1 shows the hyperglycemia population statistic for whole day, overnight, and daytime with respect to 24 hours. For the whole day average percentage time in hyperglycemia is 24.8% for AP and 7.5% in SAP hence in total about 32.3%. Most of the hyperglycemia occurs during daytime, where overnight hyperglycemia is only about 5.1%. SAP hyperglycemia numbers are low which can be due to less time spent in SAP as well as the time of the day when SAP is observed. This factor becomes clearer when looking at the AP SAP usage statistics in Table 1.

TABLE 1

Consensus Metric in terms of 24 hrs and AP/SAP times divided into three consensus time intervals further subdivided into AP and SAP intervals

| | | | Mean | STD | CI | P Value |
|---|---|---|---|---|---|---|
| Consensus Metrics With Respect to AP/SAP Times | | | | | | |
| % Time in Hypoglycemia | Whole Day | AP | 0.24 | 0.33 | [0.0, 0.4] | <0.0001 |
| | | SAP | 6.7 | 5.4 | [1, 10.7] | 0.00014 |
| | Overnight | AP | 0.04 | 0.1 | [0, 0.0588] | 0.06 |
| | | SAP | 0.7 | 0.7 | [0.0, 1.1] | <0.0001 |
| | Daytime | AP | 0.19 | 0.3 | [0, 0.4] | 0.0054 |
| | | SAP | 6.05 | 5.1 | [1.3, 11] | 0.0002 |
| % Time in Range | Whole Day | AP | 58.9 | 16.5 | [46, 71] | <0.0001 |
| | | SAP | 51.4 | 14.7 | [39, 63.1] | <0.0001 |
| | Overnight | AP | 18.9 | 7.3 | [11.3, 24.1] | <0.0001 |
| | | SAP | 9.1 | 5.0 | [4.7, 13.1] | <0.0001 |
| | Daytime | AP | 40 | 11 | [33, 48] | <0.0001 |
| | | SAP | 42.3 | 14.3 | [29, 55.3] | <0.0001 |
| % Time in Hyperglycemia | Whole Day | AP | 35.3 | 13.3 | [21, 47.5] | <0.0001 |
| | | SAP | 31.8 | 16.7 | [15, 47] | <0.0001 |
| | Overnight | AP | 5.5 | 5.1 | [2.45, 6] | <0.0001 |
| | | SAP | 4.7 | 5.4 | [0, 10] | 0.0087 |
| | Daytime | AP | 21.0 | 6.9 | [20.5, 27.6] | <0.001 |
| | | SAP | 27.06 | 13.8 | [13, 40] | 0.00014 |
| % Time in SAP | Whole Day | | 14.56 | 8.12 | [10.9, 18.15] | <0.0001 |
| | Overnight | | 13.10 | 8.40 | [9.36, 16.82] | <0.0001 |
| | Daytime | | 15.66 | 8.75 | [11.8, 19.5] | <0.0001 |
| % Mean time with CGM | Whole Day | | 90 | 8.67 | [87.56, 92] | <0.0001 |
| | Overnight | | 87.00 | 6.90 | [85.2, 89.3] | <0.0001 |
| | Daytime | | 92.25 | 4.19 | [90.86, 94.6] | <0.0001 |
| Consensus Metrics With Respect to 24 hrs | | | | | | |
| % Time in Hypoglycemia | Whole Day | AP | 0.18 | 0.23 | [0.06, 0.26] | 0.0036 |
| | | SAP | 1.48 | 1.3 | [0.74, 1.9] | 0.00014 |
| | Overnight | AP | 0.03 | 0.07 | [0, 0.0588] | 0.06 |
| | | SAP | 0.17 | 0.2 | [0.06, 0.24] | 0.002 |
| | Daytime | AP | 0.15 | 0.2 | [0.04, 0.22] | 0.0054 |
| | | SAP | 1.3 | 1.2 | [0.64, 1.73] | 0.0002 |
| % Time in Range | Whole Day | AP | 44.6 | 15.5 | [31.3, 49.4] | <0.0001 |
| | | SAP | 11.2 | 4.5 | [7.1, 15.2] | <0.0001 |
| | Overnight | AP | 14.7 | 6.2 | [12.6, 18.2] | <0.0001 |
| | | SAP | 2.1 | 1.1 | [0.3, 0.76] | <0.0001 |
| | Daytime | AP | 30 | 10.5 | [19, 40] | <0.0001 |
| | | SAP | 9.2 | 4.0 | [5.1, 13.3] | <0.0001 |

TABLE 1-continued

Consensus Metric in terms of 24 hrs and AP/SAP times divided into three
consensus time intervals further subdivided into AP and SAP intervals

|  |  |  | Mean | STD | CI | P Value |
|---|---|---|---|---|---|---|
| % Time in Hyperglycemia | Whole | AP | 24.8 | 7.4 | [17.8, 27.1] | <0.0001 |
|  | Day | SAP | 7.5 | 7.1 | [3.5, 10] | <0.0001 |
|  | Overnight | AP | 3.7 | 2.8 | [2.06, 4.7] | <0.0001 |
|  |  | SAP | 1.4 | 2.1 | [0.37, 2.26] | 0.0087 |
|  | Daytime | AP | 21.1 | 6.8 | [14.9, 23.2] | <0.001 |
|  |  | SAP | 6.0 | 5.3 | [3.01, 7.8] | 0.00014 |

The percentage time in hypoglycemia with respect to 24 hours is 0.18% for AP and 1.48% in SAP overall while most of the hypoglycemia occurs during daytime (Table 1). This indicates that the Medtronic 670G controller manages hypoglycemia very well especially overnight. However, the risk of hypoglycemia is far greater when user exits from the auto mode and uses the pump in manual mode or SAP. A majority of the hypoglycemia occurs during daytime, which is reassuring because it reduces the risk of hypoglycemia-related fatalities. Overall, the hypoglycemia is less than 2% over 24 hrs.

The overall TiR is 55.8% (Table 1), which is far lower than that observed in any pilot study. One of the main reasons is auto mode exits. Although it varies among individuals (confidence interval is between 38.4% to 64.6%), this is an unsatisfactory result and shows that human factors and auto mode exits may result in poor performance in practice.

AP Vs. SAP Usage Statistics

The consensus metrics with respect to AP and SAP times evaluate controller performance without the effects of human factors such as auto mode exits or pump shutdown. As seen from Table 1, the overall hyperglycemia statistic for AP is higher than SAP, which is mainly because of overnight hyperglycemia. However, daytime hyperglycemia is much less for AP than in SAP. In the hypoglycemia statistics for AP the percentage time in hypoglycemia is much lower than that in SAP (Table 1). This indicates that AP sacrifices hyperglycemia time in order to lower hypoglycemia time indicating that the controller is conservative to mitigate the risks of hypoglycemia. This is actually a common complaint by the users of Medtronic 670G system.

TiR for AP is significantly higher than SAP but this has to be combined with CGM wear statistics shown in Table 1. Since safe basal insulin delivery mode due to CGM unavailability is considered to be a part of AP, all CGM unavailability events are encompassed in AP. Hence given that in a whole day CGM unavailability is nearly 10%, the total TiR should be recalibrated to 65.4%. However, 65.4% TiR is still far lower than the reported 72% in the pilot clinical trials. Moreover, there is a difference of 9.6% between controller performance and real-world performance seen by the user in a 24 hour period. The reason is primarily due to human factors.

Post Prandial and Post Absorptive Hyperglycemia Statistics

Post prandial hyperglycemia is a significant problem for closed loop control systems as reported in recent research. However, there has been little effort in reporting post prandial hyperglycemia as a metric in studies evaluating controller performance. Table 2 shows post prandial and daytime post absorptive statistics for the study population with respect to 24 hours and AP/SAP times respectively. With respect to 24 hours, it is shown that the percentage time in PP and PA hyperglycemia are nearly the same. Given that PP time depends on the number of meals for a person and daytime PA duration can be considered to be much higher than PP duration, the percentage time of 13.9% in PP hyperglycemia is actually much more significant than the 14.76% in PA hyperglycemia. If the present framework only considers 3 meals a day on average as seen in the study population, it actually implies that nearly 56% of post prandial time is spent in hyperglycemia.

TABLE 2

Metrics proposed in the framework

|  |  |  | Mean | STD | CI | P Value |
|---|---|---|---|---|---|---|
| Metrics With Respect to AP/SAP Times |  |  |  |  |  |  |
| % Time in PP Hyperglycemia |  | AP | 15.56 | 13.3 | [8, 22] | <0.0001 |
|  |  | SAP | 9.3 | 16.7 | [0, 21] | <0.0001 |
| % Time in PA Hyperglycemia | Daytime |  | 14.76 | 7.24 | [11.1, 17] | <0.0001 |
| Number of Biochemical Hypoglycemia Events | Whole Day | AP | 0.42 | 0.3556 | [0.3, 0.6] | <0.0001 |
|  |  | SAP | 0.24 | 0.0058 | [0.08, 0.4] | <0.0001 |
|  | Overnight | AP | 0.07 | 0.0649 | [0.039, 0.097] | <0.0001 |
|  |  | SAP | 0.022 | 0.0409 | [0.004, 0.04] | <0.0001 |
|  | Daytime | AP | 0.35 | 0.3138 | [0.2, 0.5] | <0.0001 |
|  |  | SAP | 0.58 | 0.4278 | [0.4, 0.7] | <0.0001 |
| Duration of Biochemical | Whole Day | AP | 26.29 | 9.8 | [19.3, 33.3] | <0.0001 |

TABLE 2-continued

Metrics proposed in the framework

|  |  |  | Mean | STD | CI | P Value |
|---|---|---|---|---|---|---|
| Hypoglycemic Events in mins |  | SAP | 30.44 | 15.9 | [26.4, 34.5] | <0.0001 |
|  | Overnight | AP | 35 | 3.36 | [0, 79.7] | 0.007 |
|  |  | SAP | 29.09 | 7.5 | [20.6, 37.6] | <0.0001 |
|  | Daytime | AP | 24.29 | 8.4 | [17.8, 30.8] | <0.0001 |
|  |  | SAP | 33.28 | 15.32 | [28.7, 37.9] | <0.0001 |
| σ values of the distribution ||||||||
| Variance of Velocity Distribution | Whole Day | AP |  | 1.7 |  |  |
|  |  | SAP |  | 4.7 |  |  |
|  | Overnight | AP |  | 0.94 |  |  |
|  |  | SAP |  | 1.75 |  |  |
|  | Daytime | AP |  | 1.81 |  |  |
|  |  | SAP |  | 3.73 |  |  |
|  | Post Prandial | AP |  | 2.86 |  |  |
|  |  | SAP |  | 4.5 |  |  |
|  | Post Absorptive | Daytime |  | 2.5 |  |  |
| Metrics With Respect to 24 hrs ||||||||
| % Time in PP Hyperglycemia |  | AP | 10.65 | 3.8 | [9.9, 13.6] | <0.0001 |
|  |  | SAP | 2.54 | 1.8 | [0.48, 3.23] | <0.0001 |
| % Time in PA Hyperglycemia | Daytime |  | 14.76 | 7.24 | [11.1, 17] | <0.0001 |

From Table 2 it is seen that if PP time is spent in AP then hyperglycemia time is more than if it is spent in SAP. This indicates that the controller is not aggressive enough to control PP hyperglycemia. Another important observation from the data is that depending on the individual, it is common to suspend micro-bolus insulin delivery after meal bolus insulin for a period of nearly 30 minutes on average. For suspends after a meal often there is no suspend event log in the insulin pump output file. But it is observed that there is a gap in insulin delivery. This feature of the Medtronic 670G is not explained in the user manual and the algorithmic details. Hence, it is difficult to ascertain whether a user intentionally suspends, or it is the property of the controller. This may be a reason for higher percentage in PP hyperglycemia for AP usage than SAP usage.

Biochemical Hypoglycemia Analysis

The present system 100 considers biochemical hypoglycemic events for several reasons:

A) Percentage time in hypoglycemia is a cumulative value which may not necessarily indicate hypoglycemic events of concern. Even a single isolated CGM entry under the hypoglycemic range is counted in percentage time in hypoglycemia. Hence, even if percentage time in hypoglycemia is high it may not be concerning enough to warrant change in insulin therapy.

B) The percentage time metric does not reveal events and their corresponding durations. A low percentage time in hypoglycemia may not necessarily be ignored especially if it is caused by low number of long hypoglycemic events.

The present disclosure introduces the notion of biochemical hypoglycemia as defined herein. Table 2 shows that the number of biochemical hypoglycemic events is nearly 0.66 per day. This means that every other day there is a biochemical event. It is encouraging that the events occur more frequently during the day and not overnight. Although results show that AP has more biochemical events, this is due to more time being spent in AP (85%) as opposed to SAP (15%) as shown in Table 1.

Table 2 shows the duration of biochemical events for AP and SAP. AP biochemical events have lesser duration than SAP events. Overnight events for AP however, have higher duration than SAP by 5 minutes, but tend to have lower duration during the day. During the day, the user may be more alert and mitigate hypoglycemic events faster.

CGM Velocity for AP and SAP Time Intervals

For the consensus time intervals the present system 100 sees that AP has lesser CGM velocity variance than SAP. Although individual results may vary, this shows that manual insulin management does not perform as well as the Medtronic auto-control algorithm.

Table 2 shows that PP CGM velocity variance is significantly higher than whole day CGM velocity variance. This is a point of concern and indicates that control algorithms may not provide optimal control of PP glucose dynamics. SAP on the other hand is far worse with respect to PP dynamics. PP CGM velocity also has a higher variance than PA daytime velocity.

PP hyperglycemia is a significant factor that reduces TiR in practice, which is observed to be much less among the study subjects than in the pivotal studies. Auto mode is found to have more PP hyperglycemia time than manual mode, however, auto mode has less severe hypoglycemia. This highlights that although auto mode is conservative it in practice helps reduce potentially fatal hypoglycemic events, which are observed to occur mostly during the daytime nearly 2 times every three days. These observations indicate that finer individualized configuration of controllers is essential for effective insulin management and TiR metrics may not be sufficient.

Medtronic System

A primary example of the CLC system 10, the Medtronic system, includes a continuous glucose monitor (CGM) titled the "Guardian Sensor" that collects blood glucose measurements every 5 minutes. The sensor is single use and can be used continuously for 7 days after which it has to be replaced. The replacement procedures include a recalibration process that requires the user to obtain blood glucose measurements using a Contour NextLink 2.4 Glucosemeter®. Note that this process also requires manual intervention. The Guardian Link Transmitter®, powers the CGM sensor and sends the data to the MiniMed™ 670GR insulin pump. The insulin pump utilizes the Smart Guard Technology, that modulates the insulin delivery based on the CGM data. The SmartGuard™ Technology uses a Proportional, Integrative, and Derivative controller to derive small bursts of insulin also called Micro bolus to be delivered to the user. During meals, the user uses a Bolus Wizard to compute the amount of food bolus required to maintain blood glucose levels. The user manually estimates the amount of carbohydrate intake and enters it to the Bolus Wizard. The Bolus Wizard is pre-configured with correction factor, body weight and average insulin sensitivity of the subject calculates the bolus insulin to be delivered. The user can then program the MiniMed 670G infusion pump to deliver that amount. In addition to the bolus, the MiniMed 670Ginsulin pump can also provide a correction bolus. The correction bolus amount is provided only if the CGM reading is above a threshold (typically 120 mg/dL) and is a proportional amount with respect to the difference of the CGM reading and the threshold. The SmartGuard™ technology has two methods of suspending insulin delivery: a) Suspend on low, where the insulin delivery is stopped when the CGM reading is less than a certain threshold; or b) suspend on predicted low, where the insulin delivery is stopped when the CGM reading is predicted to be less than a certain threshold. Apart from these options, insulin delivery can also be suspended manually by the user or can be suspended when the insulin reservoir is running low.

Figure 4:
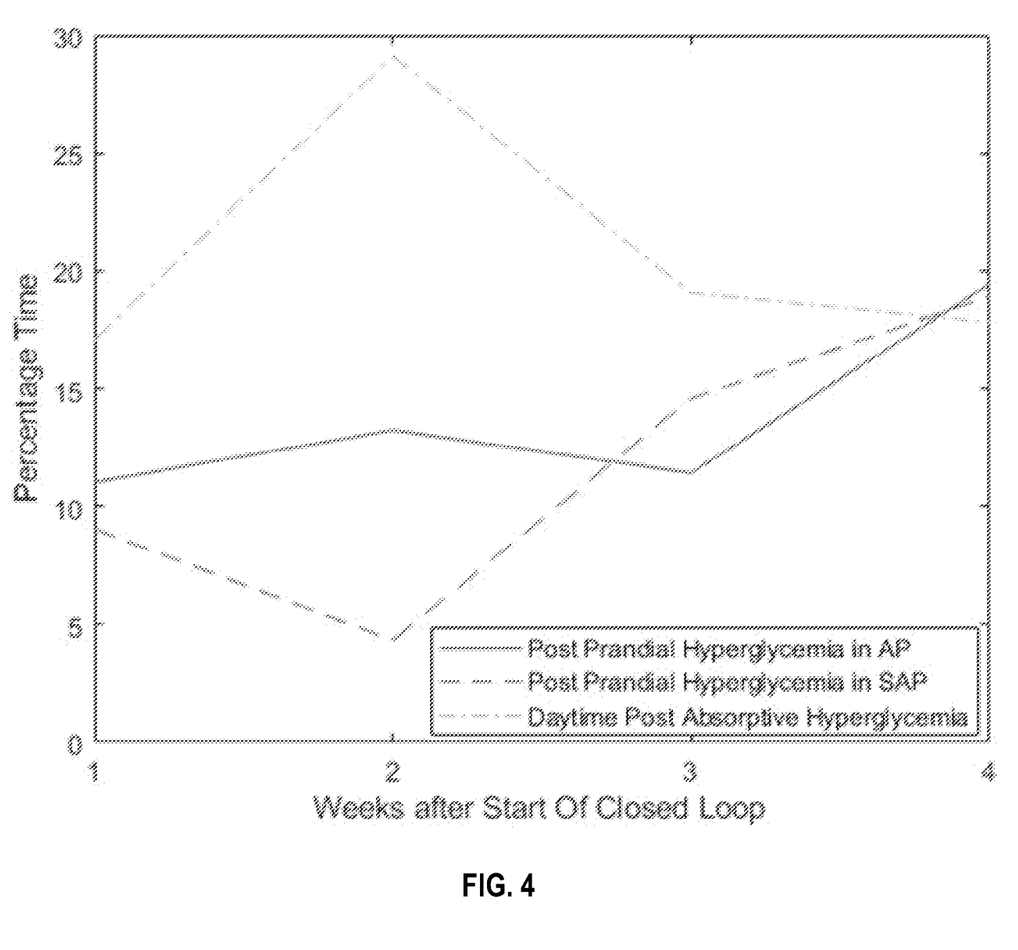
FIG. 4 is a graphical representation showing an example of weekly statistics on the time in post prandial and post absorptive hyperglycemia.

The metrics are computed on a week to week basis to evaluate weekly trends. This mode of data visualization is significant for the care provider to decide on necessary changes in insulin therapy as well as evaluate the effectiveness of a chosen insulin management method. FIG. 4 shows an example of weekly statistics on the time in post prandial and post absorptive hyperglycemia. As such this graph is only useful for trend analysis, but it can be potentially used for insulin management.

TABLE 3

Demographics information

| | |
|---|---|
| Age (years) | 44 ± 15 |
| Gender (M/F) | 24/32 |
| BMI (kg/m$^2$) | 29 ± 6.2 |
| Hemoglobin (g/dL) | 14 ± 1.4 |
| Creatinine (mg/dL) | 0.9 ± 0.3 |
| HbA1c (%) at baseline | 8 ± 1.1 |

Medtronic 670G System Data Outputs

The output of the CGM sensor includes three columns, a) data time stamp, b) the 5 minute filtered CGM reading in mg/dl, and c) the Sensor Glucose (SG) value which is the raw sensor output every 5 minutes.

The output of the pump has the following information, a) data time stamp, b) Basal setting, c) Micro bolus every 5 minutes, d) Meal intake amount in terms of grams of carbohydrate, e) Meal bolus, f) correction bolus, g) correction factor, h) CGM calibration or insulin reservoir related alarms, and i) auto mode exit events and unique codes representing reasons.

What is claimed is:

1. A system, comprising:
a closed-loop control system including a continuous glucose monitor (CGM) operable to measure and output CGM records and including an insulin pump operable to output a plurality of insulin records, wherein the closed-loop control system is operable for operation in an "auto mode" (AP) and a "manual mode" (SAP);
at least one processor in communication with a memory and operable for execution of a plurality of modules, the plurality of modules comprising:
a data synchronization module for synchronizing insulin records and the CGM records;
an exit record parser module in operative association with the insulin pump for identifying instances of AP exits performed by the closed-loop control system and for annotating one or more reasons for each instance of AP exits;
a consensus and interval segmentation module operable to segment synchronized CGM records and insulin records into a plurality of sub-segments;
an AP/SAP segmentation module in communication with the consensus and interval segmentation module and the exit record parser module, the AP/SAP segmentation module operable to divide each sub-segment of the plurality of sub-segments based on their associated AP mode or SAP mode indicated by the exit record parser module to output fully segmented data; and
a metrics extraction engine operable to derive a plurality of metrics of the fully segmented data provided by the AP/SAP segmentation module according to a decision-making framework.

2. The system of claim 1, further comprising:
a per day data segmentation module in operative communication with the data synchronization module for segmenting the CGM records and insulin records into 24-hour intervals.

3. The system of claim 1, further comprising:
a bolus and meal parser module in operative association with the insulin pump for providing meal information, wherein the meal information includes an amount of entered carbohydrate levels, a time of meal intake and associated food bolus and correction bolus inputs.

4. The system of claim 1, wherein the plurality of sub-segments includes:
a daytime segment of the CGM records;
an overnight segment of the CGM records; and
a whole day segment of the CGM records.

5. The system of claim 1, wherein the plurality of sub-segments includes:
a post prandial segment of the CGM records indicative of a post prandial hyperglycemia period; and
a post absorptive segment of the CGM records indicative of a post absorptive hyperglycemia period.

6. The system of claim 1, wherein the metrics extraction engine derives a number of CGM samples that fall in at least one range of interest and determines a percentage of time spent in each range of interest of the at least one range of interest.

7. The system of claim 6, wherein the percentage of time is determined with respect to a 24-hour period and wherein the percentage of time is determined with respect to time durations spent in AP and SAP modes.

8. The system of claim 1, wherein the metrics extraction engine identifies one or more biochemical hypoglycemic events and a duration of time associated with each biochemical hypoglycemic event of the one or more biochemical hypoglycemic events.

9. A method for extracting metrics from continuous glucose monitor (CGM) records and insulin pump records, comprising:
providing a plurality of data samples from a continuous glucose monitor (CGM) record and an insulin pump record of a closed-loop control system (CLC);
providing a processor in communication with a memory and operable to execute instructions, including:
examining a first percentage of time that the CGM record indicates being within an acceptable glucose range over a 24-hour period;
examining a second percentage of time that the CGM record indicates being within an acceptable glucose range over a period of time that the closed-loop control system is indicated to be in an auto mode (AP);
deriving a plurality of metrics associated with the CGM record and the insulin pump record, the step of deriving the plurality of metrics including:
examining a post prandial segment of CGM records indicative of a post prandial hyperglycemia period;
examining a post absorptive segment of the CGM records indicative of a post absorptive hyperglycemia period;
identifying a quantity of biochemical hypoglycemic events indicated by the CGM records; and
analyzing a plurality of velocity statistics of the CGM records.

10. The method of claim 9, further comprising:
determining if a CGM wear statistic associated with the CLC is satisfactory; and
performing a fine-grained analysis of CGM usage during the daytime or overnight to identify one or more methods to improve the CGM wear.

11. The method of claim 9, wherein the step of examining a post prandial segment of CGM records further comprises:
separating one or more post prandial segments recorded in the AP mode from one or more post prandial segments recorded in a manual (SAP) mode.

12. The method of claim 11, wherein an increase in post prandial hyperglycemia indicated by one or more post prandial segments recorded in the AP mode is indicative of a need to update a prescribed carb ratio of a user.

13. The method of claim 11, wherein an increase in post prandial hyperglycemia indicated by one or more post prandial segments recorded in the SAP mode is indicative of a need to address post prandial control strategies for a user.

14. The method of claim 9, wherein an increase in post absorptive hyperglycemia indicated by one or more absorptive segments is indicative of a need to analyze a diet composition for a user.

15. The method of claim 9, wherein a biochemical hypoglycemic event is identified by the CGM records by a low CGM reading lasting longer than a predetermined threshold value.

16. The method of claim 9, wherein a quantity of biochemical hypoglycemic events are divided into a quantity of daytime hypoglycemic events and a quantity of overnight hypoglycemic events.

17. The method of claim 16, wherein one or more daytime hypoglycemic events are indicative of a need to assess hypoglycemia risk for the user associated with a manual (SAP) mode.

18. The method of claim 16, wherein one or more overnight hypoglycemic events are indicative of a need to address methods to manage overnight hypoglycemia.

19. The method of claim 9, wherein the plurality of velocity statistics include an AP CGM velocity indicative of CGM velocity during AP mode, a manual (SAP) CGM velocity indicative of CGM velocity during SAP mode, a daytime CGM velocity indicative of CGM during the daytime, and an overnight CGM velocity indicative of CGM during an overnight interval.

20. A computer system, comprising:
at least one processor in communication with a memory and operable for execution of a plurality of modules, the plurality of modules including:
a data synchronization module for synchronizing insulin records and continuous glucose monitor (CGM) records, wherein the insulin records and CGM records are obtained from a closed-loop control system;
an exit record parser module in operative association with the insulin pump for identifying instances of AP exits performed by the closed-loop control system and for annotating one or more reasons for each instance of AP exits;
a consensus and interval segmentation module operable to segment synchronized CGM records and insulin records into a plurality of sub-segments;
an AP/SAP segmentation module in communication with the consensus and interval segmentation module and the exit record parser, the AP/SAP segmentation module operable to divide each sub-segment of the plurality of sub-segments based on their associated AP or SAP mode indicated by the exit record parser to output fully segmented data; and
a metrics extraction engine operable to derive a plurality of metrics of the fully segmented data provided by the AP/SAP segmentation module according to a decision-making framework.

21. The computer system of claim 20, further comprising:
a per day data segmentation module in operative communication with the data synchronization module for segmenting CGM records and insulin records into 24-hour intervals.

22. The computer system of claim 20, further comprising:
a bolus and meal parser module in operative association with the insulin pump for providing meal information, wherein the meal information includes an amount of entered carbohydrate levels, a time of meal intake and associated food bolus and correction bolus inputs.

23. The computer system of claim 20, wherein the plurality of sub-segments includes:
a daytime segment of CGM records;
an overnight segment of CGM records; and
a whole day segment of CGM records.

24. The computer system of claim 20, wherein the plurality of sub-segments includes:
a post prandial segment of CGM records indicative of a post prandial hyperglycemia period; and
a post absorptive segment of the CGM records indicative of a post absorptive hyperglycemia period.

25. The computer system of claim 20, wherein the metrics extraction engine derives a number of CGM samples that fall in at least one range of interest and determines a percentage of time spent in each range of interest of the at least one range of interest.

26. The computer system of claim 25, wherein the percentage of time is determined with respect to a 24-hour period and wherein the percentage of time is determined with respect to time durations spent in AP and SAP modes.

27. The computer system of claim 20, wherein the metrics extraction engine identifies one or more biochemical hypoglycemic events and a duration of time associated with each biochemical hypoglycemic event of the one or more biochemical hypoglycemic events.

\* \* \* \* \*